United States Patent
Nguyen et al.

(10) Patent No.: US 6,733,919 B1
(45) Date of Patent: May 11, 2004

(54) BATTERY SPACER AND CIRCUIT BOARD MOUNTING APPARATUS

(75) Inventors: Thinh Nguyen, Alpharetta, GA (US); William Phelps, III, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/326,182

(22) Filed: Dec. 20, 2002

(51) Int. Cl.$^7$ .................................................. H01M 2/14
(52) U.S. Cl. .................... 429/99; 429/129; 429/130; 429/158; 429/159
(58) Field of Search ..................... 429/99, 129, 130, 429/158, 159

(56) References Cited

U.S. PATENT DOCUMENTS 5,962,159 A * 10/1999 Satou et al. ................. 429/99
6,598,626 B2 * 7/2003 Chaffee ....................... 141/65

OTHER PUBLICATIONS

U.S. 2003/0068547 Apr. 10,2003, filing date Oct. 10, 2001.*

* cited by examiner

*Primary Examiner*—Hoa Van Le
(74) *Attorney, Agent, or Firm*—Philip H. Burrus, IV

(57) ABSTRACT

This invention includes a spacer for a rechargeable battery pack. The spacer is hermaphroditic in that it may be rotated by 180 degrees and attached to itself. The spacer sits between two rechargeable battery cells and includes means for accommodating a circuit board. The spacer facilitates connections between the cells and circuit board by way of welding flexible metal tabs. The spacer allows assembly of a battery pack without the need for hand soldering.

10 Claims, 4 Drawing Sheets

BATTERY SPACER AND CIRCUIT BOARD MOUNTING APPARATUS

BACKGROUND

1. Technical Field

This invention relates generally to rechargeable battery packs, and more specifically to spacer devices for mounting circuit boards and cells within a rechargeable battery pack.

2. Background Art

Portable devices rely upon rechargeable batteries for their portability. The batteries used in these devices are more than merely rechargeable cells. Most battery packs are packaged devices with plastic housings that include many different components. They often include circuit boards with charging circuitry and protection circuitry, and sometimes fuel gauging circuitry. Further, they generally include electrical conduit to make connections from the cell and circuitry to the external terminals on the outer housing.

The conventional way to connect all of these interior components was with a hand-soldered wire. Wire is soldered from the can of the rechargeable cell to the circuitry, then to the external terminals. The problem with this method is quality. For example, cold solder joints, prevalent in any hand-soldering operation, can cause the electrical connections inside the battery pack to open. Cold solder joints thus render the battery pack useless. Additionally, solder balls can cause shorts within the battery pack, again compromising reliability.

Another method of "hooking up" all the internal components of a battery pack is with a flexible circuit. Such a solution employs Kapton® encapsulated metal with circuit components coupled thereto. Such a solution is taught in U.S. Pat. No. 6,153,834, entitled "Flexible circuit with tabs for connection to battery cells", issued Nov. 28, 2000, assigned to Motorola, Inc.

While this solution is effective, Kapton® is quite expensive. With the cost of many electronic devices, like cellular phones, falling well below $100, manufacturers have less money to devote to the battery pack. There is thus a need for an improved, low cost, connection means for rechargeable battery packs.

DETAILED DESCRIPTION OF THE INVENTION

Figure 1:
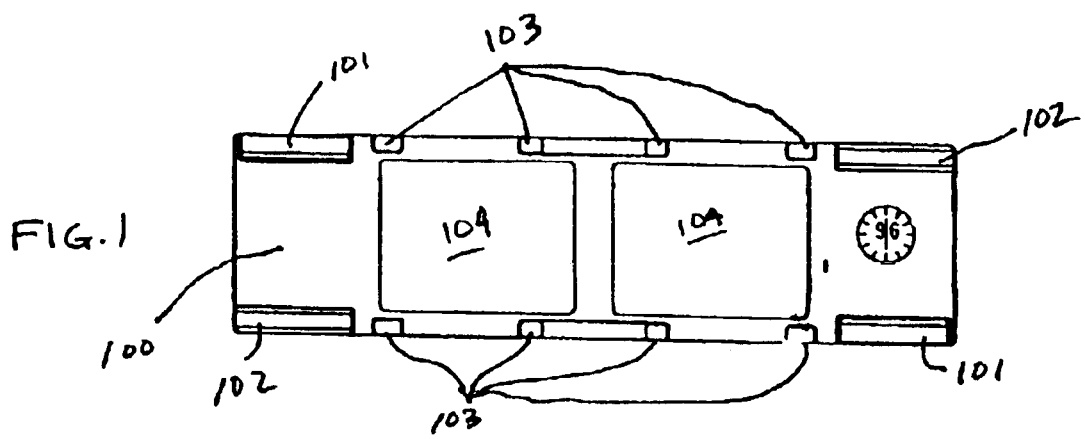
FIGS. 1–3 are mechanical drawings of a spacer in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention includes a hermaphroditic spacer that is primarily used with cylindrical, rechargeable battery cells. The spacer is hermaphroditic in that it may simply be rotated by 180 degrees about the longest side (and 180 degrees about the shortest side) and coupled to a duplicate spacer. The spacer includes concave curvatures for receiving a cylindrical cell. The spacer further includes mounting pegs that hold a rigid circuit board between two or more cells. The spacer facilitates assembly of rechargeable cell, circuit board and battery pack with welded metal tabs, thereby eliminating the need for hand soldering and greatly limiting the need for expensive flexible circuits.

Figure 2:
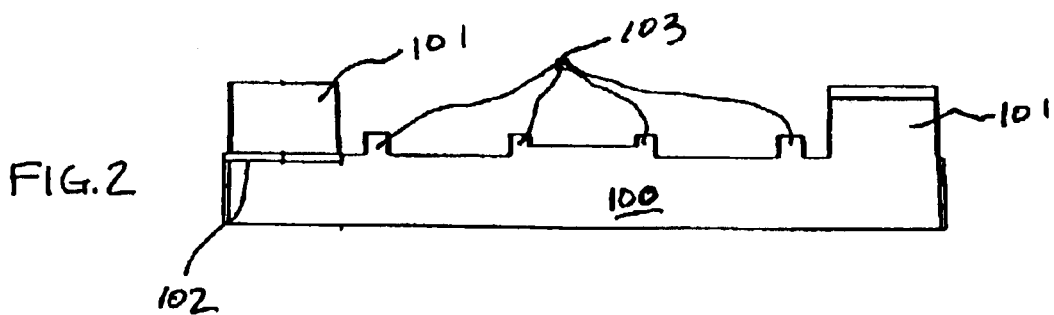
Figure 3:
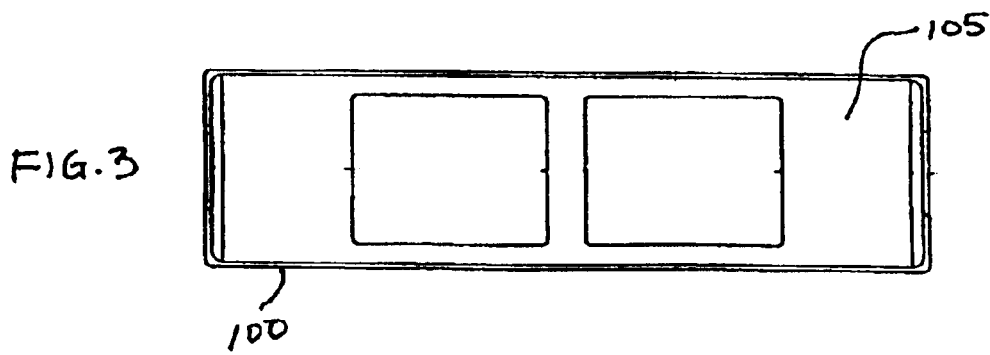

Referring now to FIGS. 1–3, illustrated therein are mechanical drawings of a spacer 100 in accordance with the invention. FIG. 1 is an interior, elevated, side view of the spacer 100. FIG. 2 is a bottom, plan view of the spacer 100. FIG. 3 is an exterior, elevated, side view of the spacer 100. The spacer 100 includes at least two stabilizing members 101. These are preferably located at opposite ends of the spacer 100. The spacer 100 includes a corresponding number of stabilizing member receptacles 102. The stabilizing member receptacles 102 mate with the stabilizing members 101 when two of the spacers 100 are coupled together. (See FIG. 4.)

The spacer 100 includes a plurality of mounting prongs 103 into which a rigid circuit board may be disposed. The rigid circuit board may include any of the following: charging circuitry, protection circuitry, diagnostic circuitry or fuel gauging circuitry. The spacer 100 preferably includes one or more apertures 104. The apertures 104 allow the spacer 100 to be manufactured with less material, thereby saving cost. The apertures 104 also facilitate thermal transfer within the battery pack.

The spacer 100 is preferably manufactured by way of an injection molding process. The preferred construction material is a rigid plastic material, like ABS, polycarbonate or polycarbonate-ABS.

Figure 4:
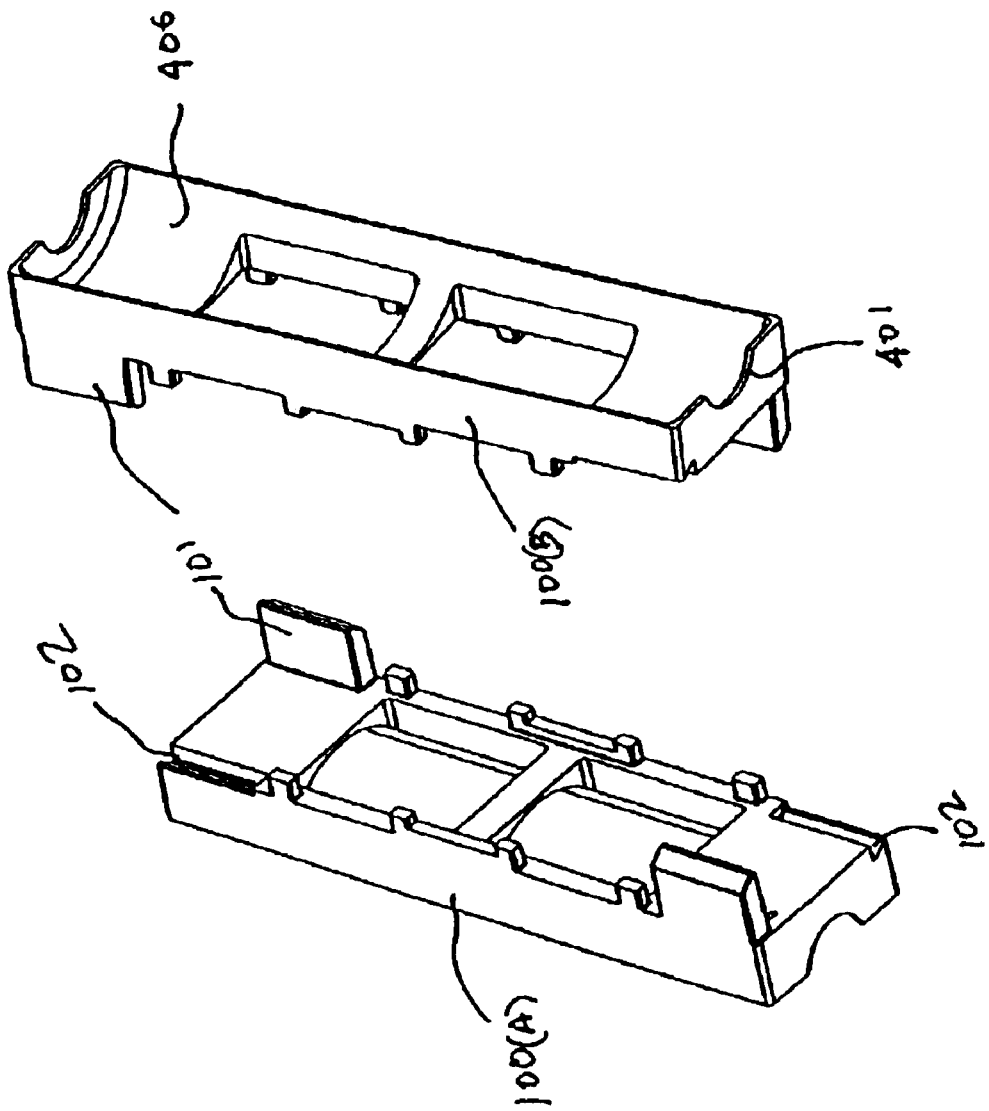
FIG. 4 is a pair of spacers in accordance with the invention.

Referring now to FIG. 4, illustrated therein is a pair of spacers 100(a) and 100(b). The spacers 100(a–b) are of the same design. Spacer 100(b) has been rotated 180 degrees about its longest axis, as well as 180 degrees about its shortest axis, with respect to spacer 100(a). The reference designators 100(a) and 100(b) have been used to explain the rotation in the text, but as the spacers 100(a) and 100(b) are the same, they will be referred to as spacers 100 going forward.

The isometric view of FIG. 4 illustrates the concave curvature 400 on the exterior side of the spacer 100. The concave curvature 400 runs the length of the spacer 100 and is designed to mate with the particular cell being used in the application. For example, if the cell is an 18–650 cell (so named due to its cylindrical metal can with a 18 mm diameter and 65 mm length), then the concave curvature will have a 9 mm radius (excluding tolerances, perhaps 0.5 mm in either direction) to mate with the cell. The spacer 100 further includes a semicircle cut away 401 to facilitate tab connection as will be described below.

Figure 5:
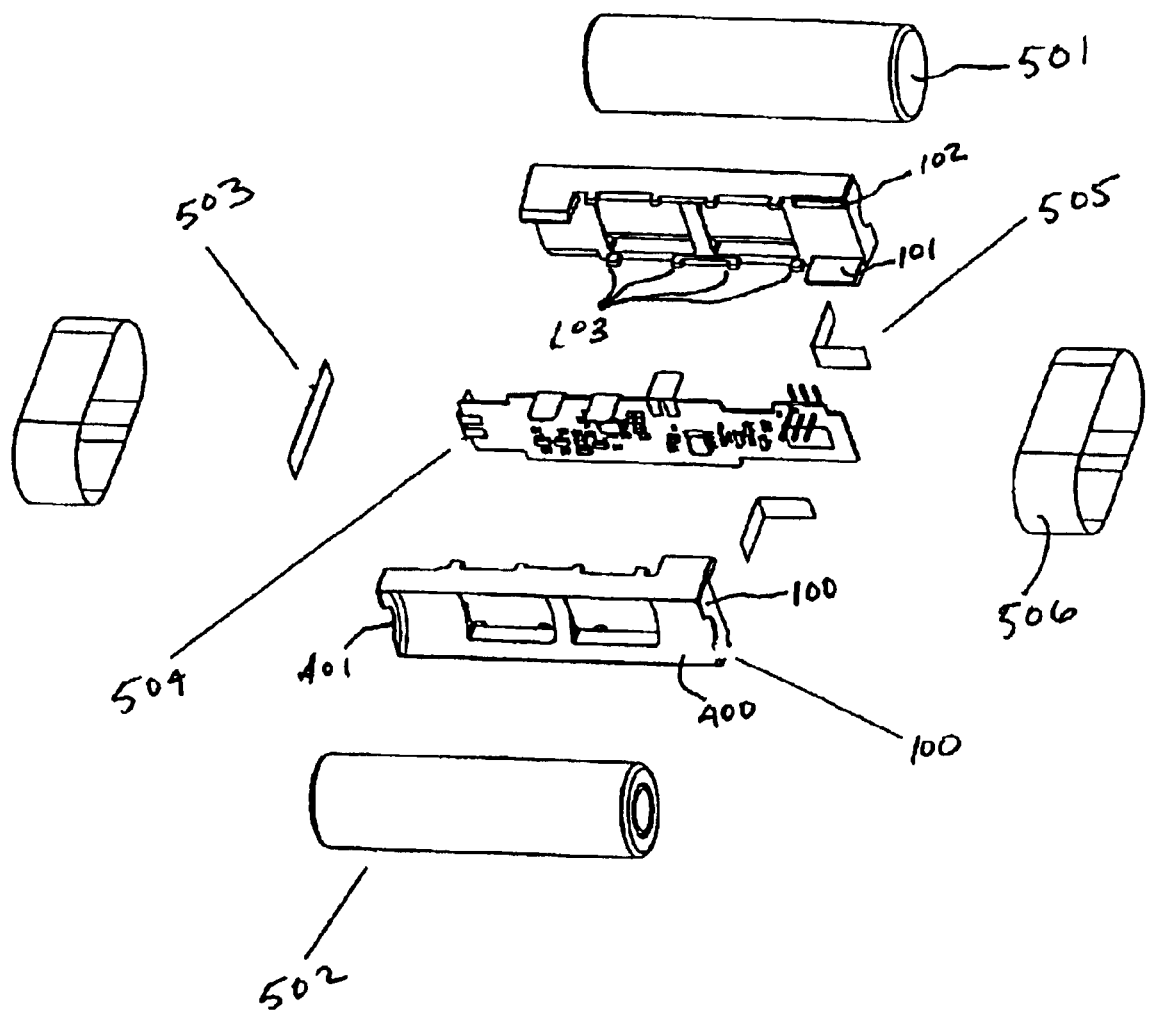
FIG. 5 is an exploded view of a battery assembly in accordance with the invention.

Referring now to FIG. 5, illustrated therein is an exploded view of a battery assembly in accordance with the invention. The battery assembly includes at least two spacers 100, a circuit board 500, at least two rechargeable cells 501,502 and a plurality of flexible metal tabs 503–505. Metal tab 504 is soldered on the circuit board, preferably by way of a reflow soldering process. The assembly is manually assembled by placing the cells 501,502 in the concave curvatures 400 of the spacers 100. The circuit board 500 is then positioned between the spacers 100 so as to be seated among the mounting prongs 103. The assembly is then coupled together such that the stabilizing member receptacles 102 mate with the stabilizing members 101. Optional support 506 may be added with either a tooled end cap or adhesive tape.

The flexible metal tabs 503 are then welded to the cells 501,502. For example, tab 503 is welded to the cathode of cell 502 and to the anode of cell 501 (for a serial configuration). The tab 503 bends slightly about the ends of the spacer and seats itself in the semicircle cut aways 401. Likewise, tab 505 is welded to cell 501 and then to the circuit board.

Figure 6:
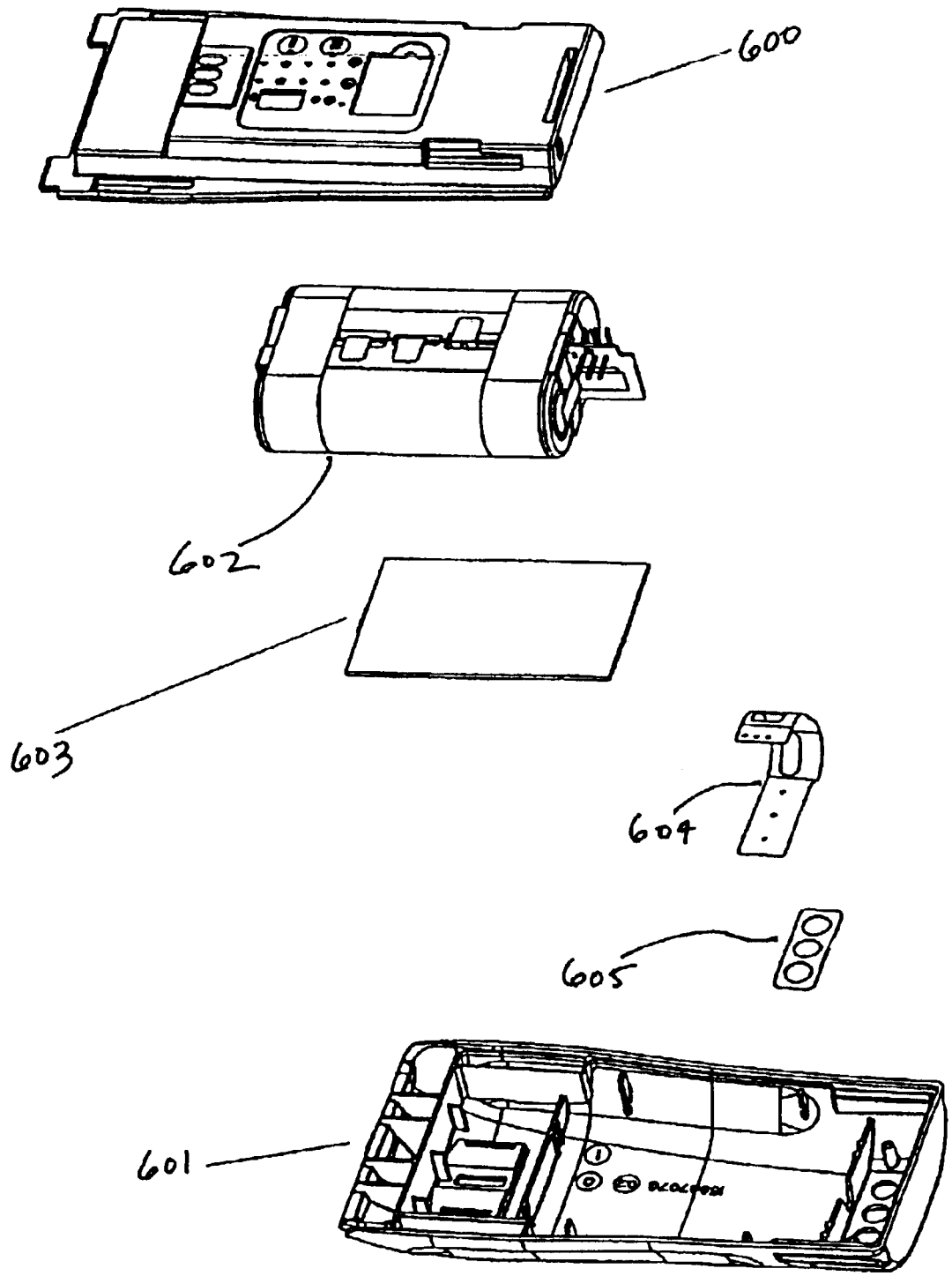
FIG. 6 is an exploded view of a battery pack in accordance with the invention.

Referring now to FIG. 6, illustrated therein is an exploded view of a battery pack in accordance with the invention. The battery pack preferably includes an inner housing 600 and an outer housing 601. The cell-board-spacer assembly 602 is disposed within the housings 600,601. An optional adhesive strip 603 may be employed to position the assembly 602 within the housings 600,601. A very small flexible circuit 604 may be used to couple the assembly 602 to external electrical contacts 605.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while the exemplary cells used herein are 18–650 cells, it will be clear to those of ordinary skill that any number of different cells could be used.

What is claimed is:

1. A hermaphroditic spacer for a rechargeable battery pack, the spacer comprising:
   a. a first side comprising:
      i. at least one stabilizing member;
      ii. at least one stabilizing member receptacle; and
      iii. at least one mounting prong; and
   b. a second side comprising a concave curvature for accommodating at least one rechargeable cell.

2. The spacer of claim 1, further comprising at least one aperture.

3. The spacer of claim 2, wherein the concave curvature has a radius of between 8.5 and 9.5 millimeters.

4. A battery assembly comprising:
   a. at least a first and a second spacer as in claim 1;
   b. at least two rechargeable cells; and
   c. at least one circuit board;
      wherein the second spacer is rotated 180 degrees with respect to the first;
      further wherein the at least first and second spacers are disposed between the at least two rechargeable cells;
      further wherein the at least one circuit board is disposed between the at least first and second spacers.

5. The assembly of claim 4, further comprising flexible metal tabs electrically coupling the at least two rechargeable cells to the at least one circuit board.

6. The assembly of claim 5, wherein the spacer further comprises semicircular cut aways.

7. The assembly of claim 6, wherein at least one of the flexible metal tabs is positioned within at least one of the semicircular cut aways.

8. The assembly of claim 7, wherein the flexible metal tabs are coupled to the at least two rechargeable cells by way of welding.

9. The assembly of claim 8, wherein the at least two rechargeable cells are 18–650 cells.

10. A battery pack comprising:
    a. the battery assembly of claim 4;
    b. a housing;
    c. external electrical terminals mechanically coupled to the housing; and
    d. a flexible circuit;
       wherein the assembly is disposed within the housing;
       further wherein the flexible circuit electrically coupled the circuit board of the assembly to the external electrical terminals.

* * * * *